(12) United States Patent
Miyano (10) Patent No.: US 6,994,668 B2
(45) Date of Patent: Feb. 7, 2006

(54) FOUR-GROUP ENDOSCOPE OBJECTIVE LENS

(75) Inventor: Hitoshi Miyano, Saitama (JP)

(73) Assignee: Fujinon Corporation, Saitama (JP)

( * ) Notice: Subject to any disclaimer, the term of this patent is extended or adjusted under 35 U.S.C. 154(b) by 214 days.

(21) Appl. No.: 10/737,777

(22) Filed: Dec. 18, 2003

(65) Prior Publication Data

US 2004/0125469 A1 Jul. 1, 2004

(30) Foreign Application Priority Data

Dec. 25, 2002 (JP) .............................. 2002-374285

(51) Int. Cl.
*A61B 1/00* (2006.01)
*G02B 9/34* (2006.01)

(52) U.S. Cl. .................... 600/176; 359/783; 359/660

(58) Field of Classification Search ............. 600/109, 600/176; 359/658, 660, 761, 783
See application file for complete search history.

(56) References Cited

U.S. PATENT DOCUMENTS

| | | | | |
|---|---|---|---|---|
| 5,515,208 A | * | 5/1996 | Yamamoto et al. | 359/740 |
| 5,587,839 A | * | 12/1996 | Miyano et al. | 359/660 |
| 5,777,797 A | * | 7/1998 | Miyano | 359/660 |
| 5,916,148 A | * | 6/1999 | Tsuyuki | 600/176 |
| 5,936,778 A | * | 8/1999 | Miyano et al. | 359/660 |

FOREIGN PATENT DOCUMENTS

| | | |
|---|---|---|
| JP | 63-261213 | 10/1988 |
| JP | 2002-218696 | 8/2002 |

* cited by examiner

*Primary Examiner*—John P. Leubecker
(74) *Attorney, Agent, or Firm*—Arnold International; Jon W. Henry; Bruce Y. Arnold (57) ABSTRACT

A four-group endoscope objective lens includes, in order from the object side, a first lens group of negative refractive power, a second lens group of positive refractive power, a diaphragm, and third and fourth lens groups of positive refractive power. The second and fourth lens groups each include a lens component that includes two lens elements. Some lens elements of the first, third, and fourth lens groups have particular shapes or refractive powers. The endoscope objective lens may include only six lens elements and satisfy certain specified conditions.

20 Claims, 10 Drawing Sheets

FOUR-GROUP ENDOSCOPE OBJECTIVE LENS

BACKGROUND OF THE INVENTION

The present applicant has previously disclosed an endoscope objective lens having a four-group, six lens element construction in Japanese Laid-Open Patent Application S63-261213. The present applicant has also previously disclosed an endoscope objective lens having a four-group, five lens element construction in Japanese Patent Application 2002-218696. The endoscope objective lens disclosed in Japanese Patent Application 2002-218696 is intended to provide a wide-angle view with an adequate back focal length while correcting lateral color, results which are difficult to satisfy simultaneously.

Enlarging the field angle of a lens in order to create a wider angle lens requires shortening the focal length if the image size remains constant. However, if the size of the entire lens system is simply reduced proportionally based on an existing endoscope objective lens, the back focal length is also proportionally shortened, making it difficult to insert a prism for deflecting the light path between the prism entrance surface and an imaging element. Thus, it is necessary to not shorten the back focal length while achieving wide-angle conversion. However, if the construction is such that the object side lens component is formed of cemented lens elements and operates to correct lateral color, the longer the back focal length, the weaker the correction of lateral color. Because lateral color not only generates color blurring of the image periphery but also reduces the resolution of the peripheral section, a large lateral color aberration prevents precise observation essential to a precise diagnosis based on imaging through the endoscope.

The four-group, five lens element endoscope objective lens mentioned previously provides a good balance of sufficient back focal length, wide-angle view, and correction of lateral color. However, there is a need for an endoscope objective lens with an even longer back focal length in order to assure an adequate back focal length with sufficient space for filters, such as a lowpass filter and/or an infrared rejecting filter, along with a prism between the image side lens element and the imaging element. With the use of such filters, more than five lens elements may be necessary in order to achieve the desired correction of lateral color because of the longer back focal length.

BRIEF SUMMARY OF THE INVENTION

The present invention relates to an endoscope objective lens of a four-group, six lens element construction with good optical performance including correction of aberrations, especially lateral color aberration, while providing a wide-angle view of about 130 to 140 degrees and a sufficient back focal length for insertion of other optical components. Further, the present invention relates to a compact objective lens for placement on the tip section of an endoscope for use with high resolution imaging elements used for detecting and outputting image information.

BRIEF DESCRIPTION OF THE DRAWINGS

The present invention will become more fully understood from the detailed description given below and the accompanying drawings, which are given by way of illustration only and thus are not limitative of the endoscope objective lens of present invention, wherein.

DETAILED DESCRIPTION OF THE INVENTION

First, definitions of the terms "lens element," "lens component," and "lens group" that relate to the following detailed description will be given. The term "lens element" is herein defined as a single transparent mass of refractive material having two opposed refracting surfaces, which surfaces are positioned at least generally transversely of the optical axis of the endoscope objective lens. The term "lens component" is herein defined as (a) a single lens element spaced so far from any adjacent lens element that the spacing cannot be neglected in computing the optical image forming properties of the lens elements or (b) two or more lens elements that have their adjacent lens surfaces either in full overall contact or, overall, are so close together that the spacings between adjacent lens surfaces of the different lens elements are so small that the spacings can be neglected in computing the optical image forming properties of the two or more lens elements. Thus, some lens elements may also be lens components. Therefore, the terms "lens element" and "lens component" should not be taken as mutually exclusive terms. In fact, the terms may frequently be used to describe a single lens element in accordance with part (a) above of the definition of a "lens component."

The term "lens group" is herein defined as a group of one or more lens components in optical series along an optical axis that, for known purposes of lens evaluation and lens design, may be considered equivalent to a single lens element. Known lens design and evaluation techniques determine whether a group of one or more lens components in optical series is properly considered a lens group. As more precise lens evaluation and lens design techniques are considered, a lens group that includes more than one lens component may be divided into further lens groups, and that process of division may proceed, in some cases, until a lens group that includes only one lens component is identified.

Figure 1:
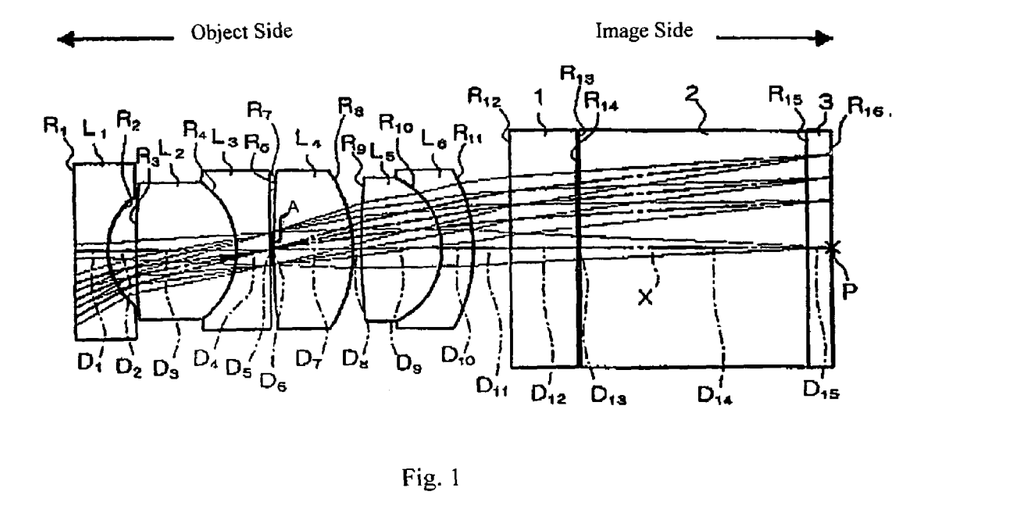
FIG. 1 shows a cross-sectional view of Embodiment 1.

A general description of the endoscope objective lens of the present invention that pertains to all four embodiments of the invention will first be described with reference to FIG. 1 that shows Embodiment 1. In FIG. 1, lens elements are referenced by the letter L with a subscript denoting their order from the object side of the endoscope objective lens, from $L_1$ to $L_6$. Similarly, the radii of curvature of all the surfaces are referenced by the letter R with a subscript denoting their order from the object side, from $R_1$ to $R_{16}$. The on-axis surface spacings (along the optical axis X of FIG. 1) of all the optical surfaces are referenced by the letter D with a subscript denoting their order from the object side, from $D_1$ to $D_{15}$, as shown in FIG. 1. A lens component formed of two lens elements is referenced by the letter L with a subscript identifying the lens elements as a sum of those lens elements denoted.

As shown in FIG. 1, an endoscope objective lens of the present invention has a four-group, six element construction, where each lens group is a lens component. Arranged from the object side are: a first lens group having negative refractive power and formed of a lens element $L_1$ with a concave surface on the image side; a second lens group having a positive refractive power and formed of a lens component $L_{2+3}$ that is made by joining a second lens element $L_2$ and a third lens element $L_3$; a third lens group formed of a fourth lens element $L_4$ having different radii of curvature on its two side, with the lens surface of smaller radius of curvature on the image side; and a fourth lens group having a positive refractive power and formed of a lens component $L_{5+6}$ that is made by joining a fifth lens element $L_5$ having positive refractive power and a sixth lens element $L_6$ having negative refractive power and a meniscus shape so that the lens elements $L_5$ and $L_6$ have adjoining lens surfaces.

As shown in FIG. 1, a diaphragm A that operates generally as an aperture stop is placed between the lens component $L_{2+3}$ and the fourth lens element $L_4$. Also, on the image side of the sixth lens element $L_6$ there is a filter system 1 that includes a lowpass filter and an infrared-rejecting filter. On the image side of the filter system 1 there is a reflecting prism 2 for deflecting incident light from the filter system 1. Additionally, a cover glass 3 which receives light from the reflecting prism 2 has its image-side surface positioned at the location of the photographing surface of a CCD element. The letter P in FIG. 1 denotes a central image forming position along the optical axis X.

Further, preferably the following Condition (1) is satisfied:

$$1.50<|d \cdot (1/f_1)|<2.50 \qquad \text{Condition (1)}$$

where d is the distance along the optical axis between the concave lens surface of the first lens element $L_1$ and the diaphragm; and $f_1$ is the focal length of the first lens element $L_1$.

Condition (1) limits the numerical value range of the absolute value of the product of the distance d and the refractive power (which equals $1/f_1$) of the first lens element $L_1$. The negative refractive power of the first lens $L_1$ may also be largely determined by the curvature of this image-side concave surface, and if the negative refractive power is large, the back focal length may easily also be made relatively large. Satisfying Condition (1) helps achieve a relatively large back focal length while maintaining a wide-angle field of view. If the above ratio of Condition (1) is smaller than the lower limit of Condition (1), the back focal length tends to decrease, which makes it difficult to obtain enough space for the reflecting prism 2. On the other hand, if the above ratio of Condition (1) is larger than the upper limit of Condition (1), a large back focal length is easily obtained, but that tends to excessively increase the total length of the lens system. When used as an endoscope objective lens, this results in an excessive length in the tip section of the endoscope and makes the endoscope more difficult to operate. Also, if the power of the first lens element $L_1$ is large, and the above ratio of Condition (1) is larger than the upper limit of Condition (1), it becomes difficult to correct curvature of field of the image.

Also, preferably the following Condition (2) is satisfied:

$$0.96<f/h<1.04 \qquad \text{Condition (2)}$$

where h is the maximum height of the image, which is at the image side surface of the cover glass 3; and f is the focal length of the endoscope objective lens.

Condition (2) limits the ratio of the focal length f of the endoscope objective lens divided by the maximum image height h in order to assure sufficient peripheral light intensity in an extremely wide-angle endoscope objective lens. The reason this ratio is set near unity in Condition (2) is as follows. In a wide-angle lens, it is well known that, if negative distortion is removed, the peripheral light intensity decreases according to the fourth power of the cosine of the angular deviation from the optical axis. For example, the peripheral light intensity at a 130° angle from the optical axis is only 3.2% of the light intensity on-axis, which is unsatisfactory for viewing. The amount of distortion of the optical system necessary for obtaining sufficient peripheral light is approximately $[(\tan \omega)^{-1}-1] \times 100$ (in percent), where $\omega$ denotes the half angle of view.

The amount of distortion D, in percent, is defined by:

$$D=100 \times (Y_{real}-Y_{ideal})/Y_{ideal}$$

where $Y_{real}$ is the actual image height, and $Y_{ideal}$ is the ideal image height.

Using the value $[(\tan \omega)^{-1}-1] \times 100$ as this amount of distortion D, $Y_{real}$ as being the maximum image height h, and $Y_{ideal}$ as being equal to $f \times \tan \omega$, where f is the focus length, the ratio of the maximum image height h and the focal length f is determined to be unity. According to Condition (2), this unity value may vary by four percent and still obtain sufficient peripheral light for observation.

Additionally, preferably the following Condition (3) is satisfied:

$$2.00<f_{2+3}/f<25.0 \qquad \text{Condition (3)}$$

where $f_{2+3}$ is the focal length of the second lens group formed of lens component $L_{2+3}$ that is made by joining the second lens element $L_2$ and the third lens element $L_3$; and f is as defined above.

Condition (3) effectively corrects curvature of field by regulating the focal length of the lens component $L_{2+3}$, which has positive refractive power as a whole. If the above ratio of Condition (3) is smaller than the lower limit of Condition (3), the curvature of field is positive (i.e., the focus point at the periphery is farther than the focus point on-axis). On the other hand, if the above ratio of Condition (3) is larger than the upper limit of Condition (3), the curvature of field is negative (i.e., the focus point at the periphery is nearer than the focus point on-axis). The refractive power of the lens component $L_{2+3}$ is mainly due to its convex lens surface on the object side, that is, the object side lens surface of the second lens element $L_2$, and Condition (3) concerns adjusting the shape of this lens surface for correcting aberrations.

Further, preferably the following Condition (4) is satisfied:

$$15.0<|\nu_2-\nu_3| \qquad \text{Condition (4)}$$

where $\nu_2$ is the Abbe number of the second lens element $L_2$; and $\nu_3$ is the Abbe number of the third lens element $L_3$.

Condition (4) defines the difference in Abbe numbers of the lens materials, glass in particular, of the second lens element $L_2$ and the third lens element $L_3$ that form the lens component $L_{2+3}$ having a positive refractive power. Condition (4) is necessary for correcting lateral color and on-axis chromatic aberration. Additionally, the Abbe number of the material forming the concave lens element needs to be larger than the Abbe number of the material forming the convex lens element of the lens elements $L_2$ and $L_3$.

Also, preferably the following Condition (5) is satisfied:

$$10.0<f \cdot (\nu_5-\nu_6)/(|R| \cdot Bf) \qquad \text{Condition (5)}$$

where f is as defined above;

$v_5$ is the Abbe number of the fifth lens element $L_5$;

$v_6$ is the Abbe number of the sixth lens element $L_6$;

|R| is the absolute value of the radius of curvature of the adjoining lens surfaces of the fifth lens element $L_5$ and the sixth lens element $L_6$; and Bf is the back focal length of the endoscope objective lens.

If the lower limit of Condition (5) is not satisfied, it becomes difficult to correct the lateral color.

Satisfying Conditions (1) through (5) results in an endoscope objective lens with a wide-angle view, sufficient back focal length for the insertion of a prism and/or filter(s), and good optical performance. The Conditions (1)–(5) are interrelated. For example, the back focal length Bf, which is one variable of Condition (5), is closely related to the variables of Condition (1). Variations in the variables that enlarge the ratio of Condition (1) and that enlarge the back focal length Bf are also related to the correction of lateral color, associated with Condition (5).

Chromatic aberration can be sufficiently corrected by making the fourth lens element $L_4$ have positive refractive power with surfaces of different radii of curvature, with its surface of smaller radius of curvature on the image side. Also, it is preferable that the third lens element $L_3$ have a planar surface on its image side or at least a lens surface with a radius of curvature that is larger than the radius of curvature of the object-side lens surface of the second lens element $L_2$. Additionally, it is preferable that the positive fifth lens element $L_5$ have a planar surface on its object side or at least a lens surface with a large radius of curvature. The phrase, "a lens surface with a large radius of curvature" means a lens surface that is nearly planar and has substantially no refractive power by itself.

The construction of the third lens element $L_3$ and/or the fifth lens element $L_5$ may be determined so as to, to a large extent, correct the entire lens system for chromatic aberrations.

Four embodiments of the present invention will now be individually described with further reference to the drawings.

Embodiment 1

FIG. 1 shows the basic lens element configuration and lens group positions of the endoscope objective lens of the present invention. As shown in FIG. 1, the endoscope objective lens is a four-group, six element endoscope objective lens that includes, in order from the object side: a first lens element $L_1$ that is plano-concave with its concave surface on the image side and which forms the first lens group; a lens component $L_{2+3}$ that forms the second lens group and is formed by joining a second lens element $L_2$ that is a biconvex with different radii of curvature, with its lens surface of greater radius of curvature on the object side with a third lens element $L_3$ that is plano-concave with its concave surface on the object side; a fourth lens element $L_4$ that forms the third lens group and which is biconvex with surfaces of different radii of curvature, with its lens surface of greater radius of curvature on the object side; and a lens component $L_{5+6}$ that forms the fourth lens group made by joining a fifth lens element $L_5$ that is biconvex with surfaces having different radii of curvature, with its lens surface of greater radius of curvature on the object side with a sixth lens element $L_6$ of negative refractive power and a meniscus shape, with its convex surface on the image side. As described previously, a filter 1, a reflecting prism 2, and a cover glass 3 are placed on the image side of the lens system. The diaphragm A has an effective radius of curvature of infinity.

Table 1 below lists the surface number #, in order from the object side, the radius of curvature R (in mm) of each surface, the on-axis surface spacing D (in mm), as well as the refractive index $N_d$ and the Abbe number $v_d$ (at the d-line) of each lens element for Embodiment 1, as well as other optical components which may be inserted between the endoscope objective lens and the back focus.

TABLE 1

| # | R | D | $N_d$ | $v_d$ |
|---|---|---|---|---|
| 1 | ∞ | 0.400 | 1.88299 | 44.4 |
| 2 | 0.850 | 0.350 | 1.00000 | |
| 3 | 10.000 | 1.234 | 1.84665 | 23.8 |
| 4 | −1.071 | 0.400 | 1.80609 | 40.9 |
| 5 | ∞ | 0.000 | 1.00000 | |
| 6 (stop) | ∞ | 0.035 | 1.00000 | |
| 7 | 10.000 | 0.970 | 1.62041 | 60.3 |
| 8 | −1.800 | 0.100 | 1.00000 | |
| 9 | 9.458 | 1.000 | 1.62041 | 60.3 |
| 10 | −1.000 | 0.400 | 1.84665 | 23.8 |
| 11 | −2.053 | 0.458 | 1.00000 | |
| 12 | ∞ | 0.830 | 1.51680 | 64.2 |
| 13 | ∞ | 0.035 | 1.00000 | |
| 14 | ∞ | 2.800 | 1.55919 | 53.9 |
| 15 | ∞ | 0.300 | 1.51680 | 64.2 |
| 16 | ∞ | | | |

Embodiment 1 is designed for an object distance of fifteen millimeters. In this embodiment, the object-side lens surface of the first lens element $L_1$ and the image-side lens surface of the third lens element $L_3$ are planar, which makes polishing these lens surfaces easy and reduces the manufacturing cost. By making the image-side lens surface of the third lens element $L_3$ flat, the diaphragm may be formed directly on the flat lens surface. This reduces errors in assembling the lens system and makes assembly easier, thereby reducing the assembly cost of the lens system.

Figure 5A:
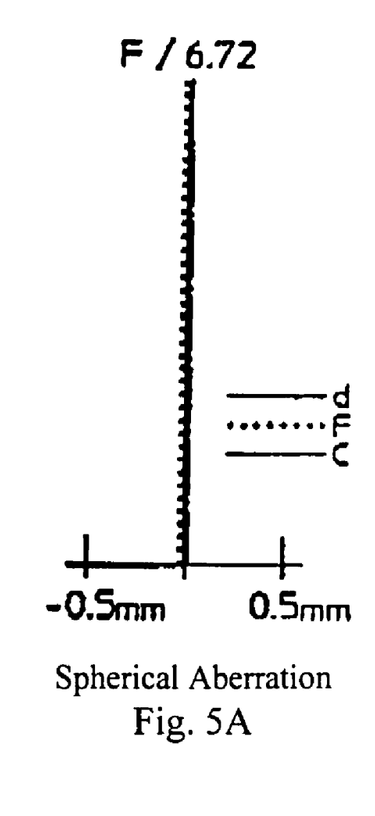
FIGS. 5A–5K show aberrations of Embodiment 1.
Figure 5B:
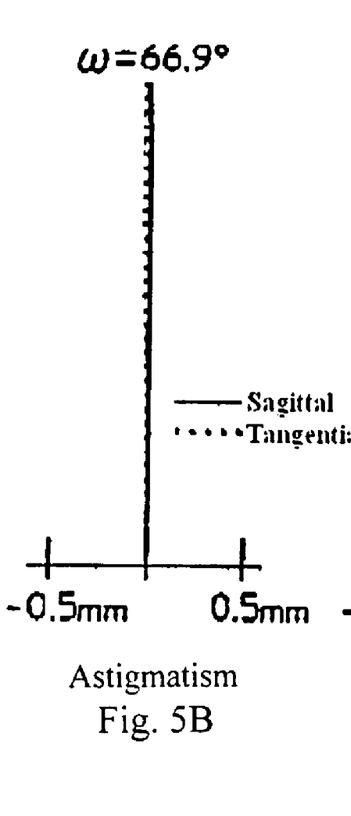
Figure 5C:
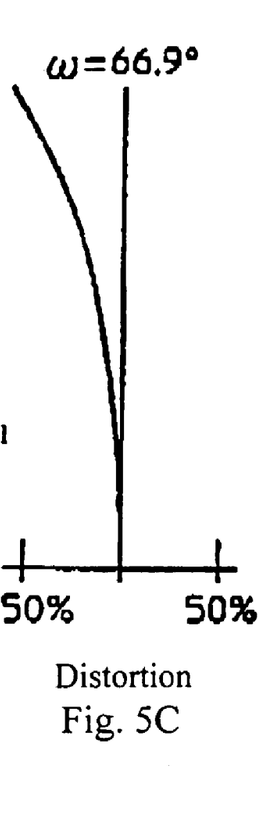
Figure 5D:
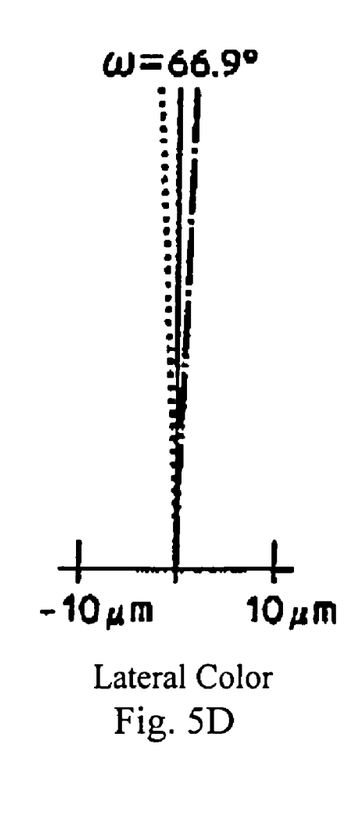
Figure 5E:
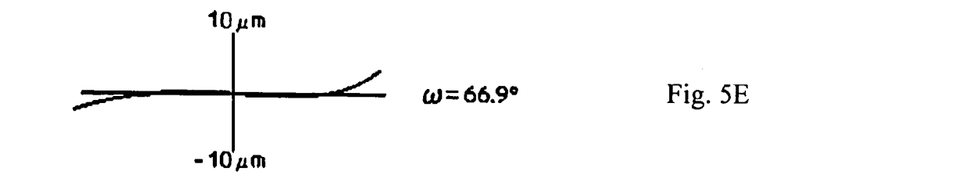
Figure 5F:
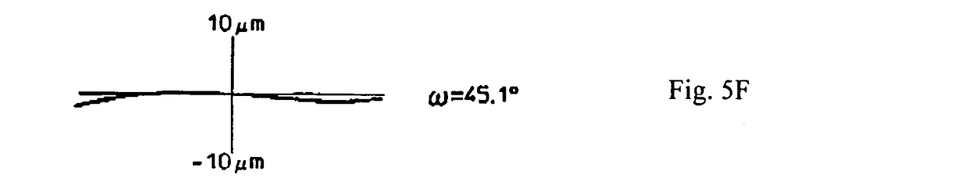
Figure 5G:
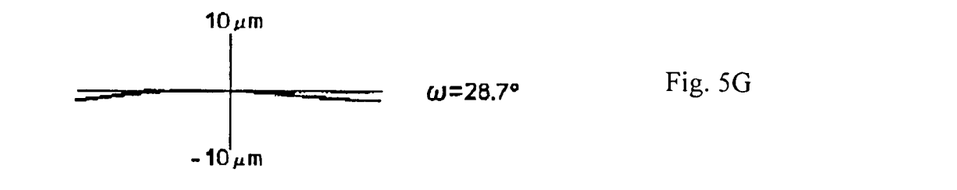
Figure 5H:
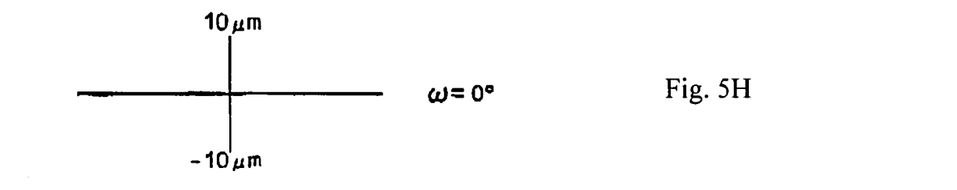
Figure 5I:
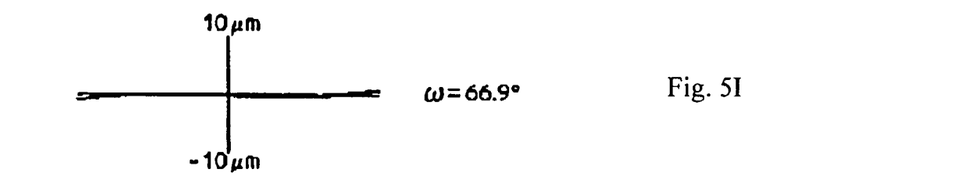
Figure 5J:
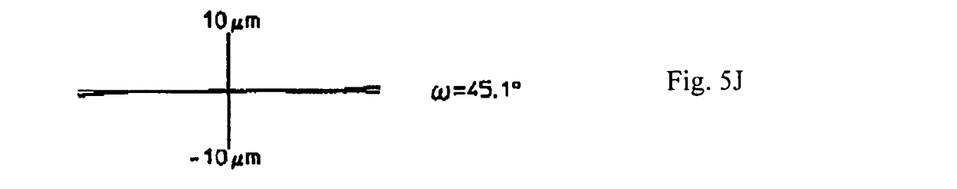
Figure 5K:
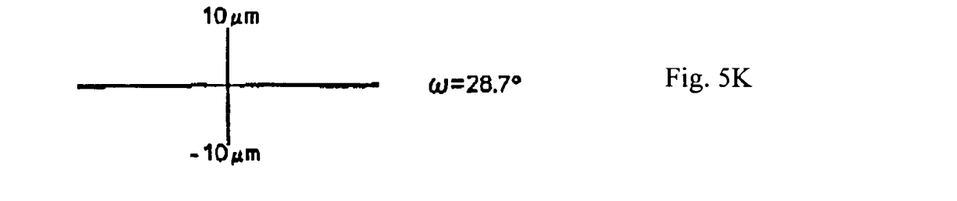

FIGS. 5A–5D show the spherical aberration, astigmatism, distortion, and lateral color, respectively, of the endoscope objective lens of Embodiment 1 focused on an object at 15 millimeters. In FIGS. 5A and 5D, the spherical aberration and lateral color, respectively, are shown for the wavelengths 587.6 nm (the d-line), 486.1 nm (the F-line), and 656.3 nm (the C-line). In these figures, ω is the half-image angle. In FIG. 5B, the astigmatism is shown for both the sagittal image surface S and the tangential image surface T. In FIGS. 5B and 5C, astigmatism and distortion, respectively, are measured at 587.6 nm (the d-line). FIGS. 5E–5K show coma at various half-image angles ω, as indicated, with FIGS. 5E–5H illustrating the tangential coma, and FIGS. 5I–5K illustrating the sagittal coma. The reason only three figures are shown for the sagittal coma is that, on axis (ω=0), sagittal coma is identical to tangential coma. As is apparent from these figures, the various aberrations are favorably corrected, including lateral color.

Embodiment 2

Figure 2:
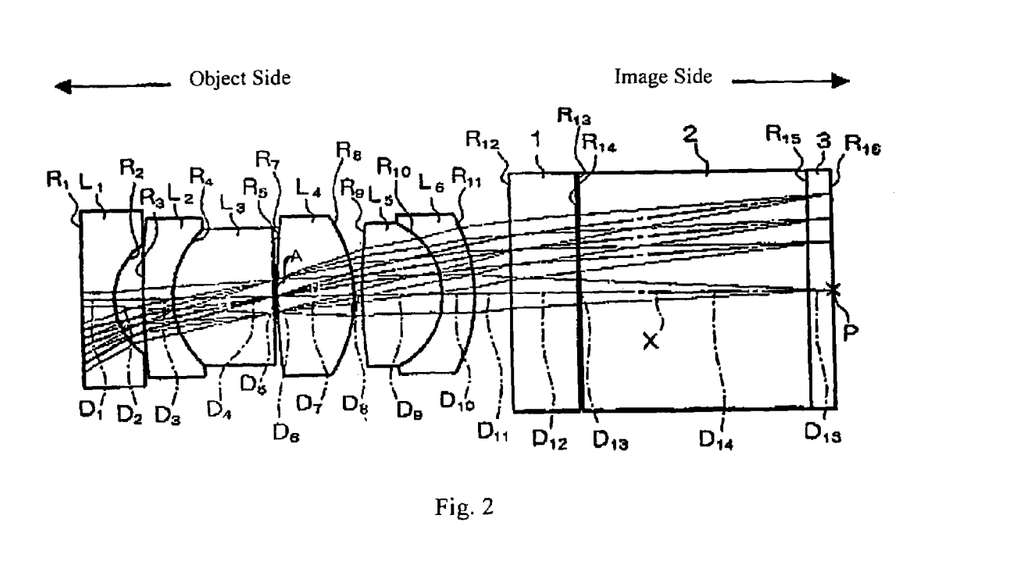
FIG. 2 shows a cross-sectional view of Embodiment 2.

FIG. 2 shows a cross-sectional view of Embodiment 2. The letter P in FIG. 2 denotes a central image forming position along the optical axis X. Embodiment 2 is very similar to Embodiment 1 and uses the same number of lens elements. Because Embodiment 2 is very similar to Embodiment 1, only the differences between Embodiment 2 and Embodiment 1 will be explained for Embodiment 2. In Embodiment 2, the second lens component $L_{2+3}$ is formed of a second lens element $L_2$ of positive refractive power having a meniscus shape with its convex surface on the object side and a third lens element $L_3$ that is plano-convex with its convex surface on the object side.

Table 2 below lists the surface number #, in order from the object side, the radius of curvature R (in mm) of each surface, the on-axis surface spacing D (in mm), as well as the refractive index $N_d$ and the Abbe number $v_d$ (at the d-line) of each lens element for Embodiment 2, as well as other optical components which may be inserted between the endoscope objective lens and the back focus.

TABLE 2

| # | R | D | $N_d$ | $v_d$ |
|---|---|---|---|---|
| 1 | ∞ | 0.400 | 1.88299 | 44.4 |
| 2 | 0.844 | 0.350 | 1.00000 | |
| 3 | 10.000 | 0.368 | 1.80609 | 40.9 |
| 4 | 1.174 | 1.234 | 1.84665 | 23.8 |
| 5 | ∞ | 0.000 | 1.00000 | |
| 6 (stop) | ∞ | 0.035 | 1.00000 | |
| 7 | 10.000 | 0.934 | 1.62041 | 60.3 |
| 8 | −1.775 | 0.100 | 1.00000 | |
| 9 | 8.273 | 1.000 | 1.62041 | 60.3 |
| 10 | −1.000 | 0.400 | 1.84665 | 23.8 |
| 11 | −2.040 | 0.450 | 1.00000 | |
| 12 | ∞ | 0.830 | 1.51680 | 64.2 |
| 13 | ∞ | 0.035 | 1.00000 | |
| 14 | ∞ | 2.800 | 1.55919 | 53.9 |
| 15 | ∞ | 0.300 | 1.51680 | 64.2 |
| 16 | ∞ | | | |

Also, a diaphragm A, a filter 1, a reflecting prism 2, and a cover glass 3 are placed in the optical system in the same manner as in Embodiment 1.

Figure 6A:
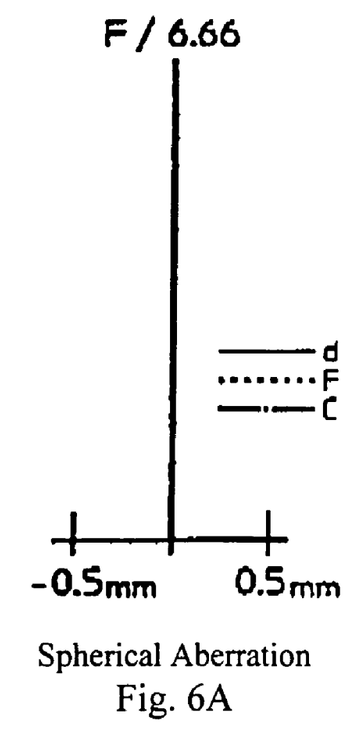
FIGS. 6A–6K show aberrations of Embodiment 2.
Figures 6B, 6C:
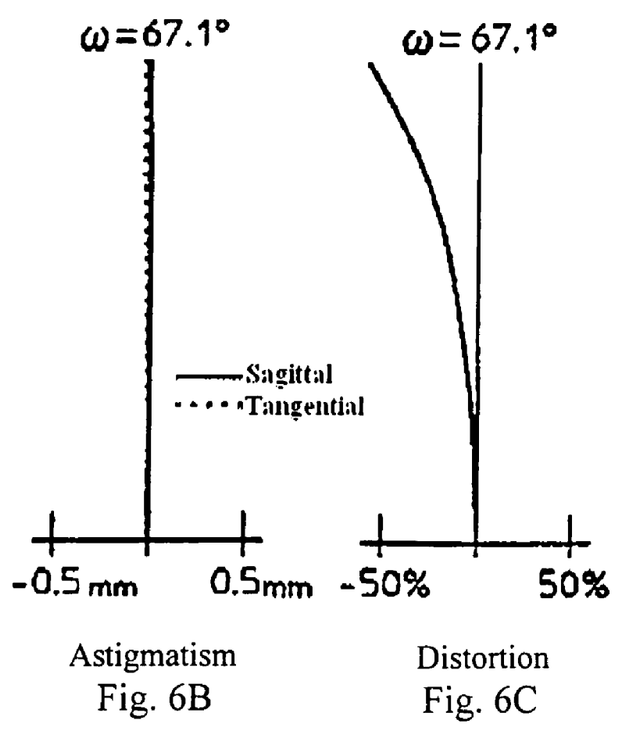
Figure 6D:
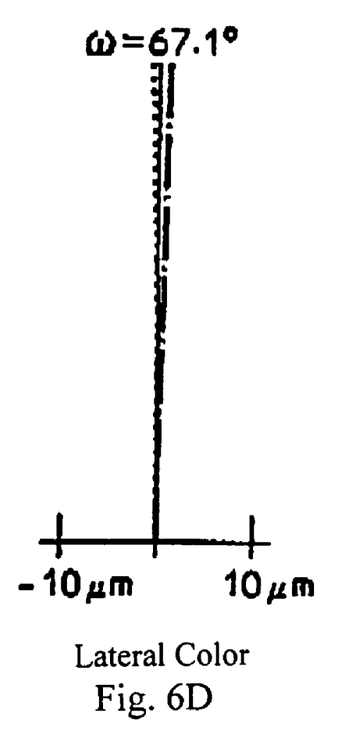
Figure 6E:
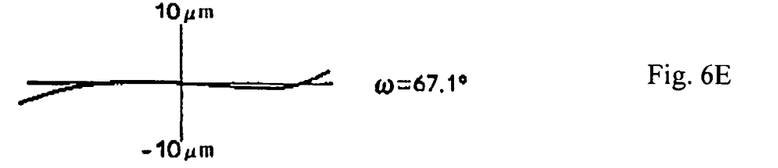
Figure 6F:
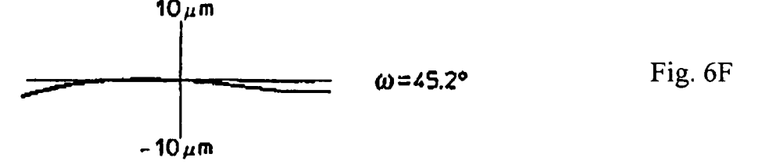
Figure 6G:
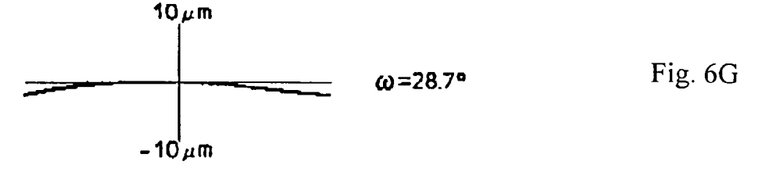
Figure 6H:
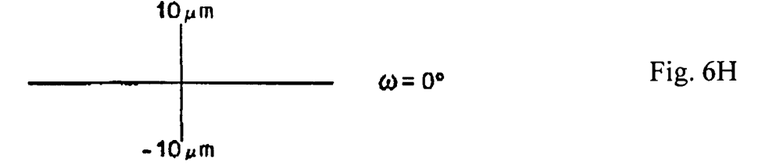
Figure 6I:
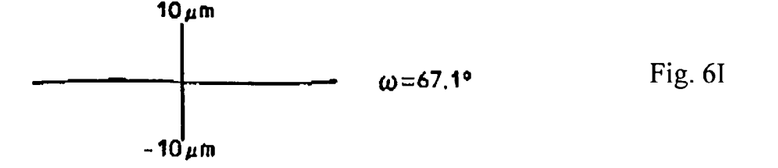
Figure 6J:
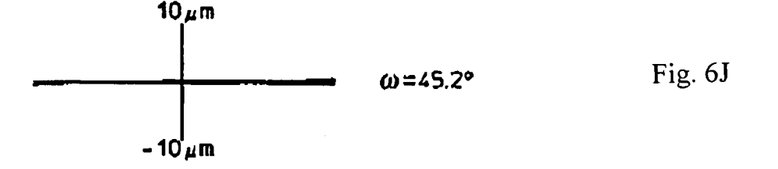
Figure 6K:
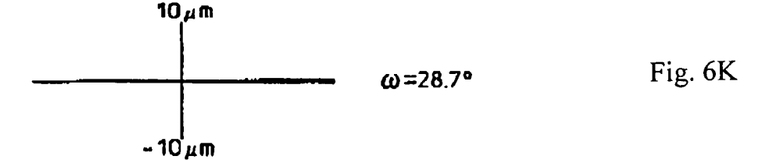

FIGS. 6A–6D show the spherical aberration, astigmatism, distortion, and lateral color, respectively, of the endoscope objective lens of Embodiment 2 focused at an object at 15 millimeters. In FIGS. 6A and 6D, the spherical aberration and lateral color, respectively, are shown for the wavelengths 587.6 nm (the d-line), 486.1 nm (the F-line), and 656.3 nm (the C-line). In these figures, ω is the half-image angle. In FIG. 6B, the astigmatism is shown for both the sagittal image surface S and the tangential image surface T. In FIGS. 6B and 6C, astigmatism and distortion, respectively, are measured at 587.6 nm (the d-line). FIGS. 6E–6K show coma at various half-image angles ω, as indicated, with FIGS. 6E–6H illustrating the tangential coma, and FIGS. 6I–6K illustrating the sagittal coma. The reason only three figures are shown for the sagittal coma is that, on axis (ω=0), sagittal coma is identical to tangential coma. As is apparent from these figures, the various aberrations are favorably corrected, including lateral color.

Embodiment 3

Figure 3:
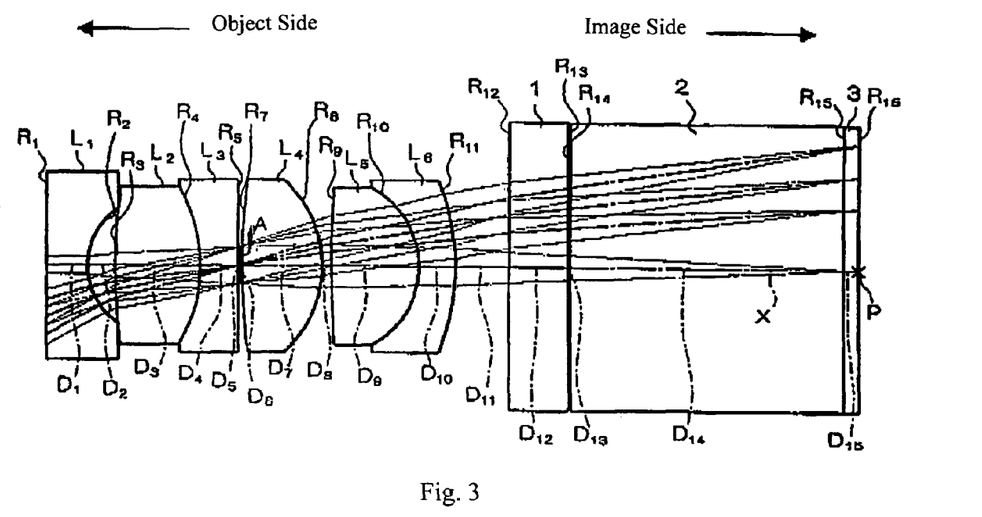
FIG. 3 shows a cross-sectional view of Embodiment 3.

FIG. 3 shows a cross-sectional view of Embodiment 3. The letter P in FIG. 3 denotes a central image forming position along the optical axis X. Embodiment 3 is very similar to Embodiment 1 and uses the same number of lens elements. Because Embodiment 3 is very similar to Embodiment 1, only the differences between Embodiment 3 and Embodiment 1 will be explained for Embodiment 3. In Embodiment 3, the third lens element $L_3$ is of negative refractive power and a meniscus shape with its convex surface on the image side.

Table 3 below lists the surface number #, in order from the object side, the radius of curvature R (in mm) of each surface, the on-axis surface spacing D (in mm), as well as the refractive index $N_d$ and the Abbe number $v_d$ (at the d-line) of each lens element for Embodiment 3, as well as other optical components which may be inserted between the endoscope objective lens and the back focus.

TABLE 3

| # | R | D | $N_d$ | $v_d$ |
|---|---|---|---|---|
| 1 | ∞ | 0.576 | 1.88299 | 44.4 |
| 2 | 0.986 | 0.368 | 1.00000 | |
| 3 | 8.054 | 1.146 | 1.84665 | 23.8 |
| 4 | −2.220 | 0.500 | 1.80609 | 40.9 |
| 5 | −1789.16 | 0.000 | 1.00000 | |
| 6 (stop) | ∞ | 0.050 | 1.00000 | |
| 7 | 9.896 | 1.072 | 1.62041 | 60.3 |
| 8 | −1.666 | 0.123 | 1.00000 | |
| 9 | 15.968 | 1.202 | 1.62041 | 60.3 |
| 10 | −1.250 | 0.500 | 1.84665 | 23.8 |
| 11 | −3.197 | 0.738 | 1.00000 | |
| 12 | ∞ | 0.810 | 1.51680 | 64.2 |
| 13 | ∞ | 0.035 | 1.00000 | |
| 14 | ∞ | 3.700 | 1.55919 | 53.9 |
| 15 | ∞ | 0.200 | 1.51680 | 64.2 |
| 16 | ∞ | | | |

Also, a diaphragm A, a filter 1, a reflecting prism 2, and a cover glass 3 are placed in the optical system in the same manner as in Embodiment 1.

Figure 7A:
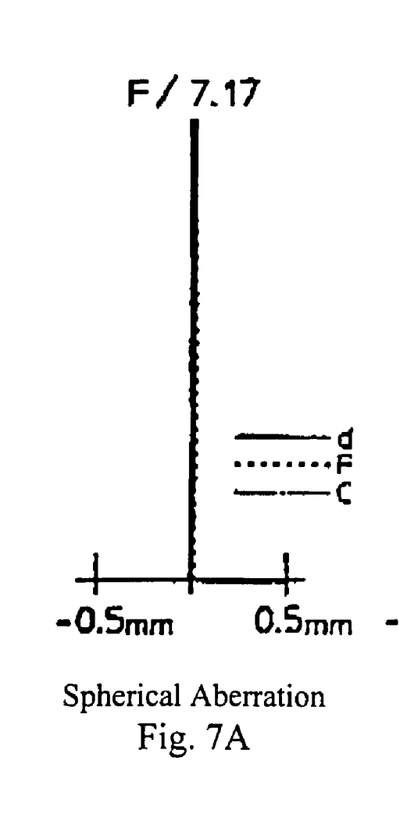
FIGS. 7A–7K show aberrations of Embodiment 3.
Figure 7B:
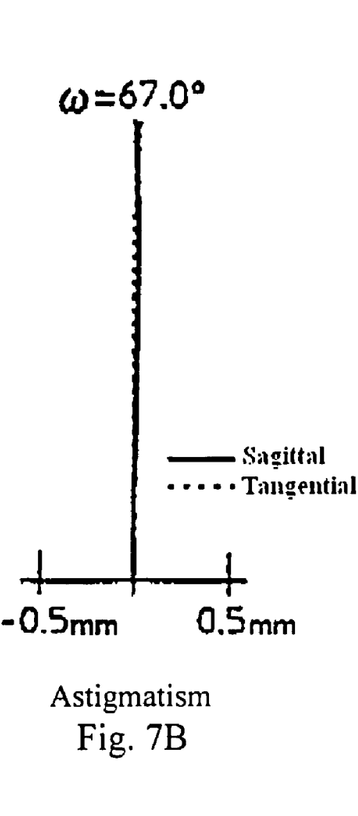
Figure 7C:
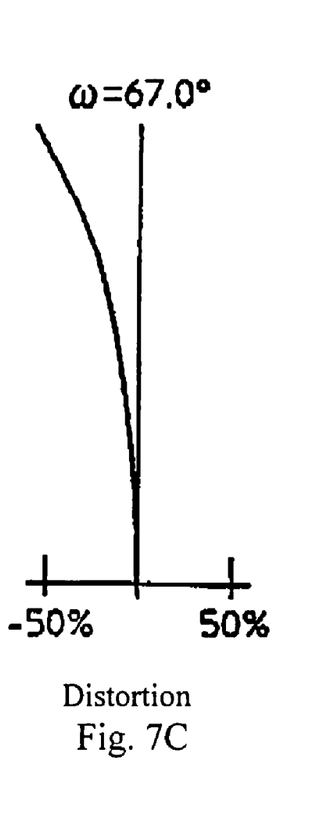
Figure 7D:
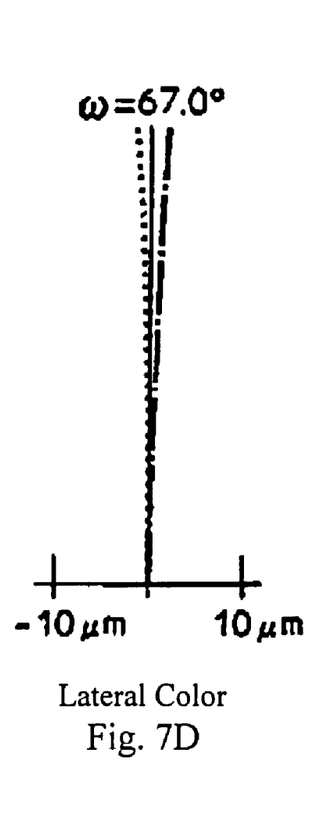
Figure 7E:
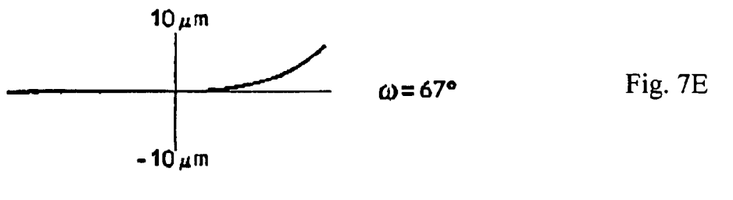
Figure 7F:
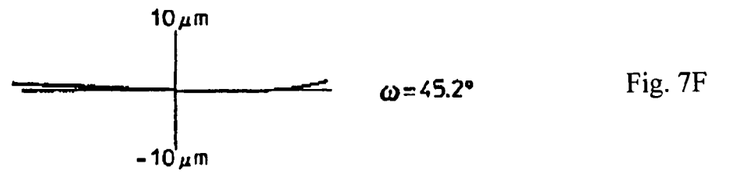
Figure 7G:
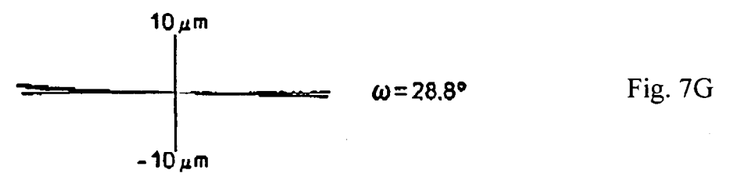
Figure 7H:
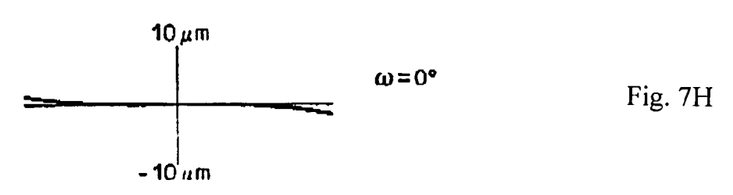
Figure 7I:
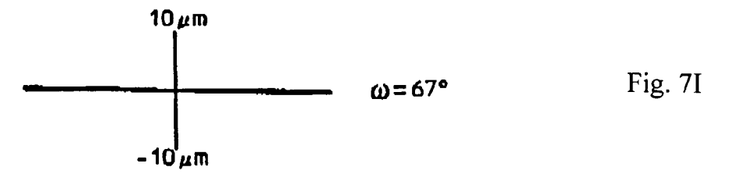
Figure 7J:
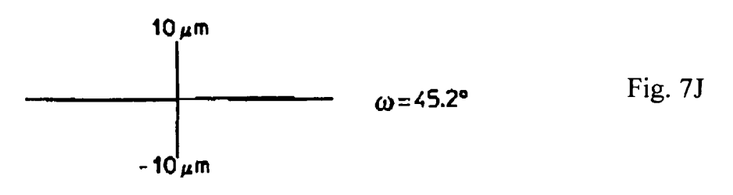
Figure 7K:
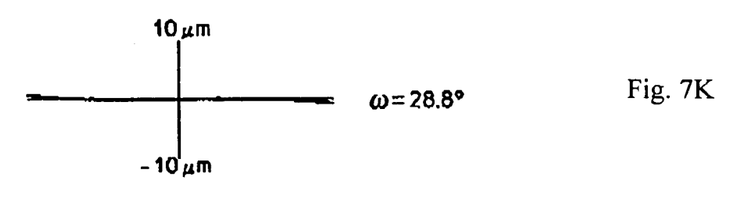

FIGS. 7A–7D show the spherical aberration, astigmatism, distortion, and lateral color, respectively, of the endoscope objective lens of Embodiment 3 focused on an object at 15 millimeters. In FIGS. 7A and 7D, the spherical aberration and lateral color, respectively, are shown for the wavelengths 587.6 nm (the d-line), 486.1 nm (the F-line), and 656.3 nm (the C-line). In these figures, ω is the half-image angle. In FIG. 7B, the astigmatism is shown for both the sagittal image surface S and the tangential image surface T. In FIGS. 7B and 7C, astigmatism and distortion, respectively, are measured at 587.6 nm (the d-line). FIGS. 7E–7K show coma at various half-image angles ω, as indicated, with FIGS. 7E–7H illustrating the tangential coma, and FIGS. 7I–7K illustrating the sagittal coma. The reason only three figures are shown for sagittal coma is that, on axis (ω=0), sagittal coma is identical to tangential coma. As is apparent from these figures, the various aberrations are favorably corrected, including lateral color.

Embodiment 4

Figure 4:
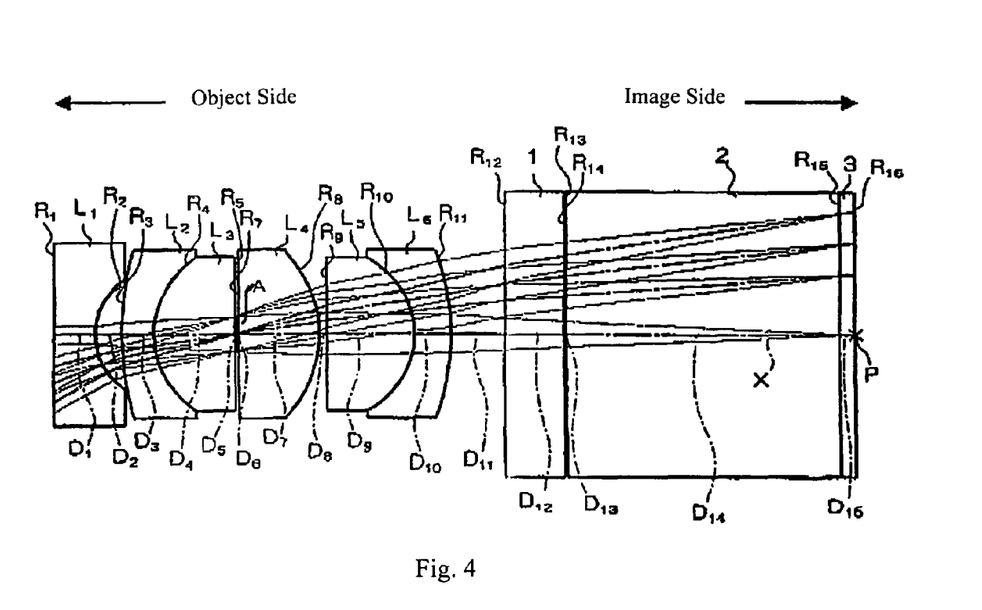
FIG. 4 shows a cross-sectional view of Embodiment 4.

FIG. 4 shows a cross-sectional view of Embodiment 4. The letter P in FIG. 4 denotes a central image forming position along the optical axis X. Embodiment 4 is very similar to Embodiment 1 and uses the same number of lens elements. Because Embodiment 4 is very similar to Embodiment 1, only the differences between Embodiment 4 and Embodiment 1 will be explained for Embodiment 4. In Embodiment 4, the third lens element $L_3$ has positive refractive power and a meniscus shape with its convex surface on the object side, and the fourth lens element $L_4$ has positive refractive power and a meniscus shape with its convex surface on the image side.

Table 4 below lists the surface number #, in order from the object side, the radius of curvature R (in mm) of each surface, the on-axis surface spacing D (in mm), as well as the refractive index $N_d$ and the Abbe number $v_d$ (at the d-line) of each lens element for Embodiment 4, as well as other optical components which may be inserted between the endoscope objective lens and the back focus.

TABLE 4

| # | R | D | $N_d$ | $\nu_d$ |
|---|---|---|---|---|
| 1 | ∞ | 0.576 | 1.88299 | 44.4 |
| 2 | 0.998 | 0.353 | 1.00000 | |
| 3 | 4.671 | 0.431 | 1.80609 | 40.9 |
| 4 | 1.353 | 1.083 | 1.80518 | 25.4 |
| 5 | 2035810. | 0.000 | 1.00000 | |
| 6 (stop) | ∞ | 0.050 | 1.00000 | |
| 7 | −1964729. | 1.088 | 1.71300 | 53.9 |
| 8 | −1.763 | 0.100 | 1.00000 | |
| 9 | 360.974 | 1.200 | 1.71300 | 53.9 |
| 10 | −1.250 | 0.500 | 1.84665 | 23.8 |
| 11 | −3.407 | 0.739 | 1.00000 | |
| 12 | ∞ | 0.810 | 1.51680 | 64.2 |
| 13 | ∞ | 0.035 | 1.00000 | |
| 14 | ∞ | 3.700 | 1.55919 | 53.9 |
| 15 | ∞ | 0.200 | 1.51680 | 64.2 |
| 16 | ∞ | | | |

Also, a diaphragm A, a filter 1, a reflecting prism 2, and a cover glass 3 are placed in the optical system in the same manner as in Embodiment 1.

Figure 8A:
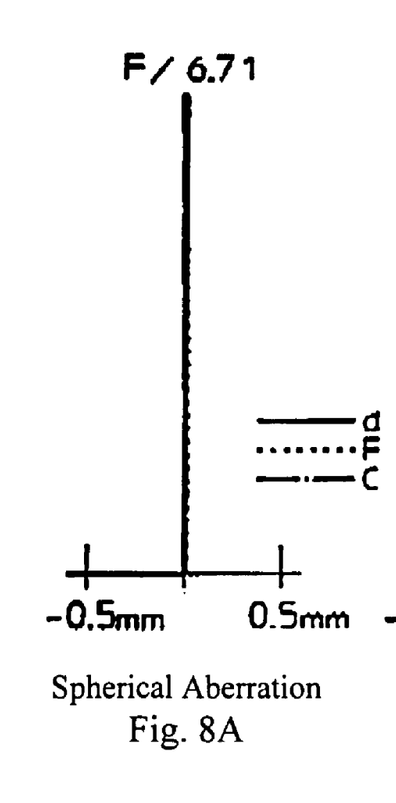
FIGS. 8A–8K show aberrations of Embodiment 4.
Figure 8B:
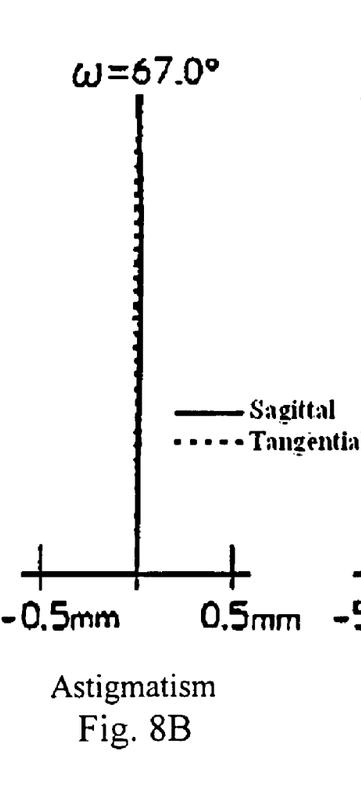
Figure 8C:
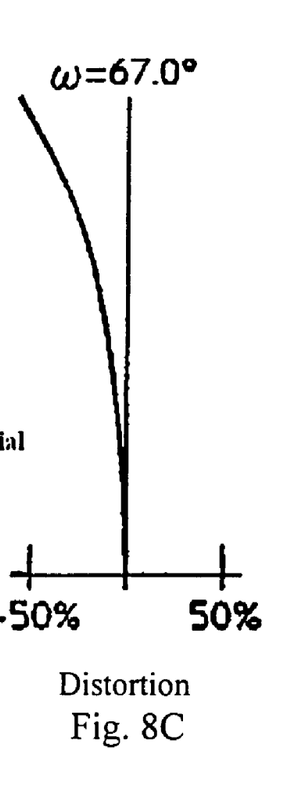
Figure 8D:
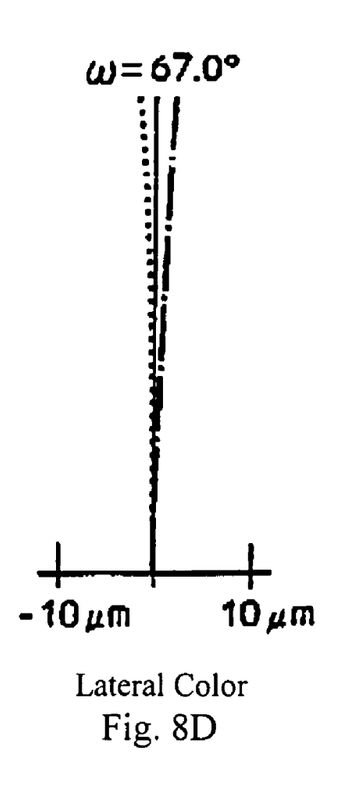
Figure 8E:
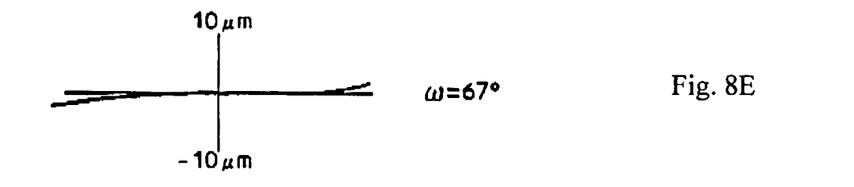
Figure 8F:
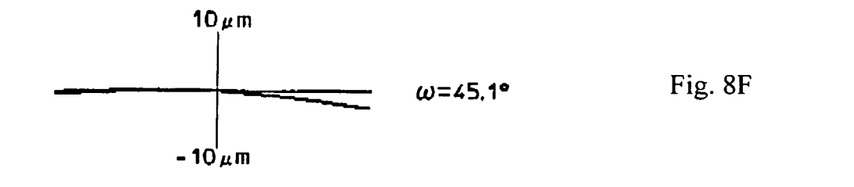
Figure 8G:
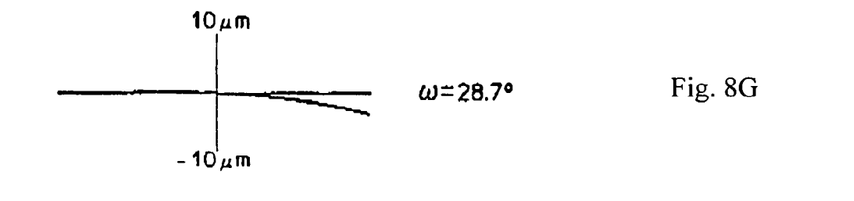
Figure 8H:
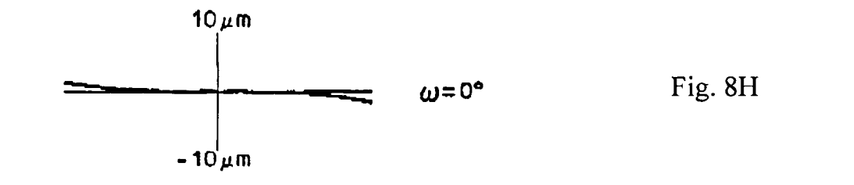
Figure 8I:
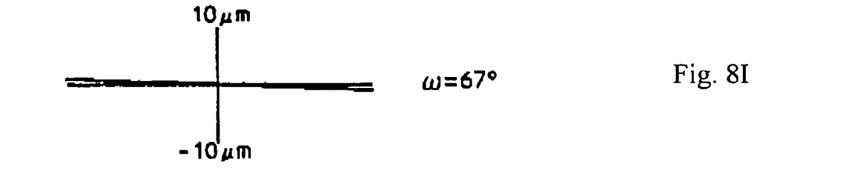
Figure 8J:
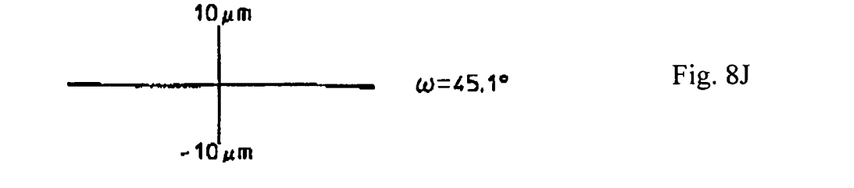
Figure 8K:
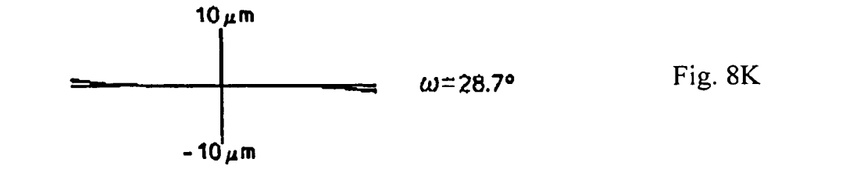

FIGS. 8A–8D show the spherical aberration, astigmatism, distortion, and lateral color, respectively, of the endoscope objective lens of Embodiment 4 focused on an object at 15 millimeters. In FIGS. 8A and 8D, the spherical aberration and lateral color, respectively, are shown for the wavelengths 587.6 nm (the d-line), 486.1 nm (the F-line), and 656.3 nm (the C-line). In these figures, ω is the half-image angle. In FIG. 8B, the astigmatism is shown for both the sagittal image surface S and the tangential image surface T. In FIGS. 8B and 8C, astigmatism and distortion, respectively, are measured at 587.6 nm (the d-line). FIGS. 8E–8K show coma at various half-image angles ω, as indicated, with FIGS. 8E–8H illustrating the tangential coma, and FIGS. 8I–8K illustrating the sagittal coma. The reason only three figures are shown for the sagittal coma is that, on axis (ω=0), sagittal coma is identical to tangential coma. As is apparent from these figures, the various aberrations are favorably corrected, including lateral color.

Table 5 below lists the values of maximum image height h, angle of view 2ω, focal length f, back focal length Bf, and Conditions (1)–(5) for Embodiments 1–4 of the endoscope objective lens of the present invention. Wavelength dependent values in Table 5 are for the d-line.

TABLE 5

| | Embodiment No: | | | |
|---|---|---|---|---|
| | 1 | 2 | 3 | 4 |
| Image Height h | 1.201 | 1.201 | 1.7496 | 1.7496 |
| Angle of View 2ω | 133.80 | 134.29 | 134.08 | 134.03 |
| Focal Length f | 1.216 | 1.217 | 1.735 | 1.742 |
| Back Focal Length Bf | 2.939 | 2.930 | 3.617 | 3.616 |
| Condition: | | | | |
| (1) $1.50 < |d/f_1| < 2.50$ | 2.060 | 2.042 | 1.803 | 1.652 |
| (2) $0.96 < f/h < 1.04$ | 1.012 | 1.013 | 0.992 | 0.996 |
| (3) $2.00 < f_{2+3}/f < 25.0$ | 6.833 | 7.173 | 4.700 | 3.339 |
| (4) $15.0 < |\nu_2 - \nu_3|$ | 17.1 | 17.1 | 17.1 | 15.5 |
| (5) $10.0 < f \cdot (\nu_5 - \nu_6)/(|R| \cdot Bf)$ | 15.098 | 15.154 | 14.006 | 11.598 |

As is shown in Table 5, each of Embodiments 1–4 satisfies Conditions (1)–(5), and provides a sufficient wide-angle view and back focal length while achieving good optical performance.

Although the endoscope objective lenses described in Japanese Laid-Open Patent Application S63-261213 are similar to the present invention in having a four-group, six lens element construction, the lens component of Japanese Laid-Open Patent Application S63-261213 that corresponds to lens component $L_{2+3}$ of the present invention has almost no refractive power. Therefore, although Condition (2) of Japanese Laid-Open Patent Application S63-261213 and Condition (3) of the present invention apply similarly to Abbe numbers of corresponding lens elements, the numerical value ranges of their respective Conditions (2) and (3) do not overlap. The corresponding values of the focal length of the lens component of Japanese Laid-Open Patent Application S63-261213 that corresponds to lens component L2+3 of the present invention are much larger than in the present invention, being 478.4 in the first example of Japanese Laid-Open Patent Application S63-261213 and 600 in the second example of Japanese Laid-Open Patent Application S63-261213. It is clear that the present invention obtains the specified effects through a balance of different lens elements from those of Japanese Laid-Open Patent Application S63-261213.

Also, although the endoscope objective lenses described in Japanese Patent Application 2002-218696 are made to have a wide-angle view and good correction of lateral color, because the back focal lengths are short compared to the present invention, they may not provide suitable space for filters. The present invention has a four-group, six lens element construction, one more lens element than in the endoscope objective lenses of Japanese Patent Application 2002-218696, and may be considered to include a two element lens component instead of the single element, second lens component $L_2$ of Japanese Patent Application 2002-218696. By increasing the number of cemented lens surfaces in the endoscope objective lens, it becomes unnecessary to depend on only the cemented surface of the fourth lens component $L_{4+5}$ positioned on the image side, as in Japanese Patent Application 2002-218696, in order to correct for lateral color and, as a result, a construction with a longer back focal length becomes possible. As the cemented surface on the image side becomes farther from the image side, it tends to correct the lateral color more weakly. It is important that the cemented surface on the image-side be arranged not far from the image plane in order to provide substantial correction of lateral color with only the cemented lens surface on the image side, which influences the back focal length. These considerations enable Condition (5) of the present invention to have a smaller lower limit value than that of Condition (3) of Japanese Patent Application 2002-218696.

The present invention is not limited to the aforementioned embodiments, as it will be obvious that various alternative implementations are possible. For instance, values such as the radius of curvature R of each of the lens elements, the surface spacings D, the refractive index $N_d$, as well as the Abbe number $\nu_d$, are not limited to the examples indicated in each of the aforementioned embodiments, as other values can be adopted. Additionally, the fourth lens element $L_4$ and/or the fifth element lens $L_5$ may be formed of positive lens elements with planar, or nearly planar, lens surfaces on the object side. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. An endoscope objective lens formed of only four lens groups, in order along an optical axis from the object side, as follows:
   a first lens group having negative refractive power;
   a second lens group having positive refractive power;
   a diaphragm;
   a third lens group having positive refractive power; and
   a fourth lens group having positive refractive power;
   wherein
   said first lens group includes a first lens element having negative refractive power and the image side lens surface of said first lens element is concave;
   said second lens group includes a lens component that includes second and third lens elements;
   said third lens group includes a fourth lens element having positive refractive power and said fourth lens element has its lens surface of smaller radius of curvature on its image side;
   said fourth lens group includes a lens component that includes a fifth lens element having positive refractive power and a sixth lens element that is a meniscus lens element having negative refractive power; and
   the following conditions are satisfied:

$1.50 < |d/f_1| < 2.50$ $0.96 < f/h < 1.04$ $2.00 < f_{2+3}/f < 25.0$ $15.0 < |\nu_2 - \nu_3|$ $10.0 < (f \times (\nu_5 - \nu_6))/(|R| \times Bf)$ where
   d is the distance along the optical axis between the concave lens surface of said first lens element and said diaphragm;
   $f_1$ is the focal length of said first lens group;
   f is the focal length of the endoscope objective lens;
   h is the maximum height of an image formed by the endoscope objective lens;
   $f_{2+3}$ is the focal length of said second lens group;
   $\nu_2$ is the Abbe number of said second lens element;
   $\nu_3$ is the Abbe number of said third lens element;
   $\nu_5$ is the Abbe number of said fifth lens element;
   $\nu_6$ is the Abbe number of said sixth lens element;
   |R| is the absolute value of the radius of curvature of the adjoining lens surfaces of said fifth lens element and said sixth lens element; and
   Bf is the back focal length of the endoscope objective lens.

2. The endoscope objective lens of claim 1, wherein said first lens group consists of said first lens element.

3. The endoscope objective lens of claim 2, wherein said second lens group consists of said lens component that includes said second and third lens elements.

4. The endoscope objective lens of claim 3, wherein said lens component that includes said second and third lens elements consists of said second and third lens elements.

5. The endoscope objective lens of claim 4, wherein said third lens group consists of said fourth lens element.

6. The endoscope objective lens of claim 5, wherein said fourth lens group consists of said lens component that includes said fifth lens element and said sixth lens element.

7. The endoscope objective lens of claim 6, wherein said lens component that includes said fifth lens element and said sixth lens element consists of said fifth lens element and said sixth lens element.

8. The endoscope objective lens of claim 1, wherein said second lens group consists of said lens component that includes said second and third lens elements.

9. The endoscope objective lens of claim 8, wherein said lens component that includes said second and third lens elements consists of said second and third lens elements.

10. The endoscope objective lens of claim 9, wherein said third lens group consists of said fourth lens element.

11. The endoscope objective lens of claim 10, wherein said fourth lens group consists of said lens component that includes said fifth lens element and said sixth lens element.

12. The endoscope objective lens of claim 11, wherein said lens component that includes said fifth lens element and said sixth lens element consists of said fifth lens element and said sixth lens element.

13. The endoscope objective lens of claim 1, wherein said third lens group consists of said fourth lens element.

14. The endoscope objective lens of claim 13, wherein said fourth lens group consists of said lens component that includes said fifth lens element and said sixth lens element.

15. The endoscope objective lens of claim 14, wherein said lens component that includes said fifth lens element and said sixth lens element consists of said fifth lens element and said sixth lens element.

16. The endoscope objective lens of claim 1, wherein said fourth lens group consists of said lens component that includes said fifth lens element and said sixth lens element.

17. The endoscope objective lens of claim 16, wherein said lens component that includes said fifth lens element and said sixth lens element consists of said fifth lens element and said sixth lens element.

18. The endoscope objective lens of claim 3, wherein said third lens group consists of said fourth lens element.

19. The endoscope objective lens of claim 18, wherein said fourth lens group consists of said lens component that includes said fifth lens element and said sixth lens element.

20. The endoscope objective lens of claim 19, wherein said lens component that includes said fifth lens element and said sixth lens element consists of said fifth lens element and said sixth lens element.

* * * * *